United States Patent Office 3,279,301
Patented Oct. 18, 1966

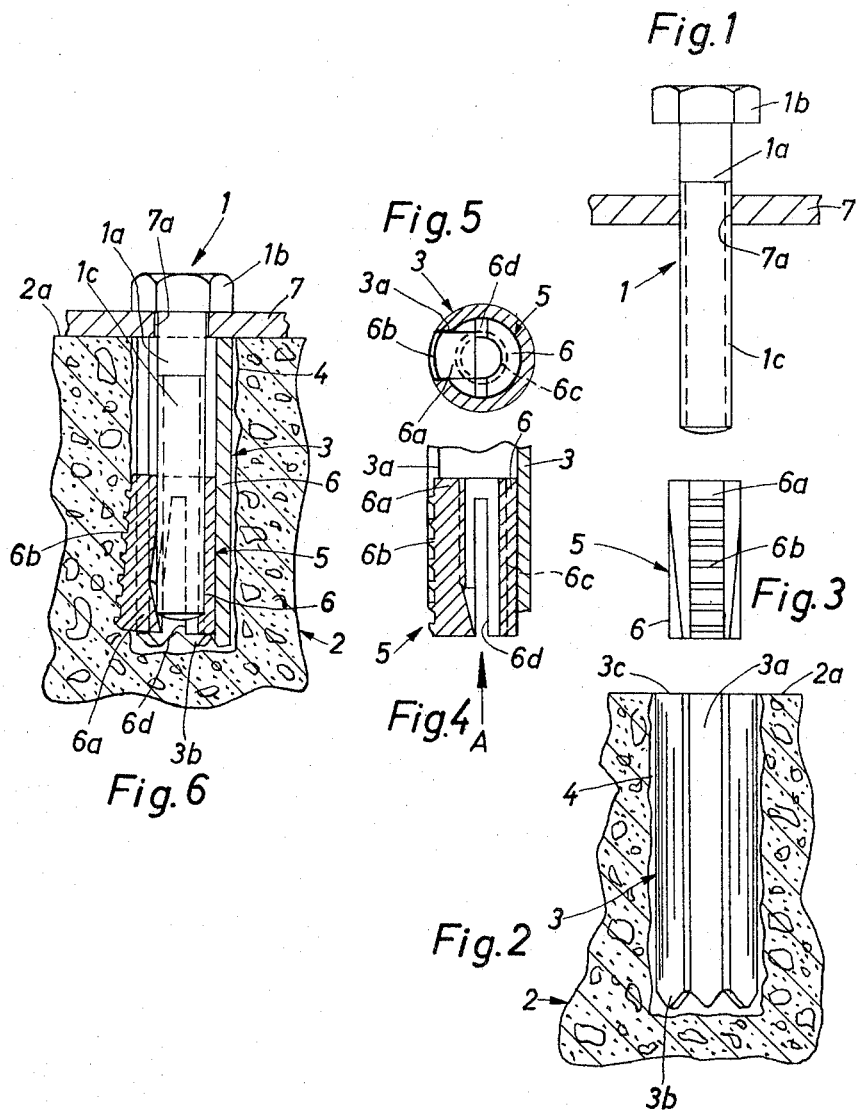

3,279,301
EXPANSION ANCHOR ASSEMBLY
Artur Fischer, Tumlingen, Kreis Freudenstadt, Germany
Filed Feb. 12, 1964, Ser. No. 344,458
15 Claims. (Cl. 85—66)

The present invention relates to expansion anchors in general, and more particularly to an improved expansion anchor assembly which may be utilized for holding apertured or otherwise configurated articles at the exposed sides of brittle wall structures.

It is an important object of my invention to provide a very simple and inexpensive but highly reliable expansion anchor assembly whose component parts are constructed and configurated in such a way that one thereof may perform another important function which is essential for properly mounting such assemblies in wall structures consisting of rock, tile, concrete, brick, plaster or another brittle material which is incapable of properly retaining a threaded fastener.

Another object of the invention is to provide an expansion anchor assembly of the just outlined characteristics which may be mounted in a brittle wall structure without resorting to expensive drilling tools such as are normally utilized for drilling expansion anchor holes in rock, concrete or the like.

A further object of the invention is to provide a low-cost drilling tool which may be utilized as a component part of the improved expansion anchor assembly.

An additional object of the invention is to provide a novel method of drilling expansion anchor holes and of mounting expansion anchor assemblies in such holes.

A concomitant object of the invention is to provide a method of mounting expansion anchor assemblies in holes of brittle wall structures in such a way that the entire operation may be completed within exceptionally short periods of time.

With the above objects in view, one feature of my invention resides in the provision of an expansion anchor assembly for holding one or more apertured articles or the like at the exposed sides of brittle wall structures which are provided with expansion anchor holes. The expansion anchor assembly comprises an elongated sleeve having a longitudinally extending slot and including a cutter portion at one end thereof so that the sleve may be utilized as a tool for drilling the hole in which the expansion anchor assembly is installed and thereupon remains in the thus drilled hole, an expander comprising a tubular portion preferably received in the cutter portion of the sleeve and a projection which is received in the slot and a part of which normally extends into the interior of the tubular portion, and a fastener comprising an elongated stem which extends through the sleeve and into the tubular portion of the expander to move the projection radially outwardly and into engagement with the material which surrounds the hole wherein the sleeve is received.

The tubular portion of the expander is preferably slotted and may be dimensioned in such a way that it expands radially outwardly when the stem of the fastener is received therein whereby the cutter portion or another part of the sleeve also expands and is held in strong frictional engagement with the material of the wall structure. Such dimensioning of the tubular portion is particularly advisable when, after the hole is drilled, the sleve is not retained with sufficient friction so that it can be extracted from the wall structure. The projection of the expander is preferably provided with suitable transversely extending ribs which may penetrate into the material of the wall structure when the tubular portion receives the stem to make sure that the expander is properly anchored in the wall structure. The tubular portion is preferably provided with internal threads to mate with external threads of the fastener. This fastener may be a bolt or a screw and is provided with a head or a similar retaining portion which holds an apertured article, through which the stem extends, against the exposed side of the wall structure. Alternatively, the fastener may be a nail or a pin which is driven into the tubular portion of the expander to deform the expander and/or the sleeve into strong frictional engagement with the wall structure.

The novel features which are considered as characteristic of the invention are set forth in particular in the appended claims. The improved expansion anchor assembly itself, however, both as to its construction and the method of mounting the same, together with additional features and advantages thereof, will be best understood upon perusal of the following detailed description of a specific embodiment with reference to the accompanying drawings, in which:

FIG. 1 is a side elevational view of a threaded fastener which extends through an apertured plate-like article and which constitutes one component part of the expansion anchor assembly;

FIG. 2 is a section through a brittle wall structure wherein an expansion anchor hole is drilled with the help of a slotted sleeve which constitutes another component part of the expansion anchor assembly and which is shown in the expansion anchor hole;

FIG. 3 is a front elevational view of a specially configurated expander which constitutes the third and last component part of the expansion anchor assembly;

FIG. 4 is an axial section through the expander and through a portion of the sleeve, and illustrates the expander in non-deformed condition;

FIG. 5 is an end view of the structure shown in FIG. 4 as seen in the direction of arrow A; and FIG. 6 is an axial section through the sleeve and expander of the expansion anchor assembly and illustrates the expander in deformed condition in which a portion of the expander penetrates into the material of the wall structure.

Referring to the drawings, and first to FIG. 1, there is shown a fasterner in the form of a bolt 1 having an elongated stem 1a and a retaining portion in the form of a hexagonal head 1b. The stem 1a extends through an aperture 72 provided in a plate-like article 7 which is to be held at the exposed side 2a of a brittle wall structure 2 shown in FIGS. 2 and 6. This wall structure may consist of brick, concrete, tile, plaster or rock and is provided with an expansion anchor hole 4 which is drilled by a tool 3. The latter constitutes the second component part of the improved expansion anchor assembly and preferably consists of low-cost sheet metal which is rolled to form a sleeve and which is provided with a longitudinally extending slot 3a. One end of the sleeve 3 has triangular cutting teeth 3b so that these teeth together constitute an annular cutter portion which enables the sleeve to penetrate into the material of the wall structure 2 and to drill the hole 4 when the other end 3c of the sleeve is connected with the chuck of a rotary drill or when the sleeve is driven into the wall structure by a suitable hammer or the like. The bore in the sleeve 3 serves as a channel for evacuation of fragments when the hole 4 is being drilled. Once the drilling of the hole 4 is completed, the sleeve 3 remains in the wall structure 2 to take the position which is shown in FIG. 2. As a rule, the sleeve 3 is then held with sufficient friction so that it cannot be readily extracted from the hole 4, especially if the material of the wall structure 2 is not excessively brittle.

In addition to the fastener 1 and sleeve 3, the improved expansion anchor assembly comprises a specially constructed and configurated metallic expander 5 which is shown in FIGS. 3 to 6. This expander comprises a tubular (preferably cylindrical) portion 6 which is receivable in the sleeve 3 so that it may be surrounded by the cutter portion 3b, and an axially extending projection or tongue 6a which is receivable in the slot 3a and whose outer face is provided with transverse ribs 6b. As best shown in FIG. 4, the lowermost end of the tongue 6a normally extends into the interior of the tubular portion 6 and the ribs 6b are then concealed in the slot 3a, i.e., the ribs 6b do not extend beyond the outlines of the sleeve 3. The tubular portion 6 is provided with internal threads 6c which may mate with external threads 1c on the stem 1a of the fastener 1.

When the operator desires to secure the article 7 at the exposed side 2a of the wall structure 2, the expander 5 is driven into the sleeve 3 in such a way that the tongue 6a travels in the slot 3a until the lower part of the tubular portion 6 enters the interior of and is then surrounded by the annular cutter portion 3b. A portion of the tongue 6a extends into the interior of the tubular portion 6 and the ribs 6b are accommodated in the lower part of the slot 3a. The operator then inserts the stem 1a into the aperture 7a and advances the stem through the sleeve 3 and into mesh with the tubular portion 6 in a manner as shown in FIG. 6. When the fastener 1 is driven home, the tongue 6a is moved radially outwardly and its ribs 6b penetrate into the material of the wall structure 2 so that the expander 5 is held with considerable force and prevents extraction of the fastener even if the latter is subjected to axial stresses.

As shown in FIGS. 4 to 6, the tubular portion 6 is provided with axially parallel slits 6d which extend upwardly from the lower end thereof and which allow the tongue 6a to move radially outwardly when the fastener 1 is driven home.

While the sleeve 3 need not necessarily be anchored in the material of the wall structure, the outer diameter of the tubular portion 6 is preferably selected in such a way that, when the threads 1c mesh with the threads 6c, the tubular portion 6 expands the cutter portion 3b to hold the sleeve 3 in strong frictional engagement with the material of the wall structure. The sleeve 3 need not necessarily resemble a cylinder, i.e., it is equally possible to utilize a sleeve of hexagonal, octagonal or other polygonal cross-sectional outline.

If necessary, the entire expansion anchor assembly may be withdrawn from the hole 4 to be reused at another point. Such removal of the expansion anchor assembly is particularly simple and may be carried out by means of simple tools if the material of the expander 5 is sufficiently elastic so that the tongue 6a returns into the slot 3a and into the tubular portion 6 when the fastener 1 is withdrawn.

It will be noted that the method of my invention comprises the steps of drilling in the exposed side of a brittle wall structure an expansion anchor hole by means of a slotted tubular drilling tool one end portion of which constitutes a cutter and thereupon leaving the tool in the thus drilled hole, inserting into the tool a radially deformable tubular expander which is preferably driven into the interior of the cutter, and introducing a fastener through the tool and into the expander to deform the latter radially outwardly and preferably through the slot of the tool so that the expander and/or the tool is held in strong frictional engagement with the material which surrounds the expansion anchor hole and prevents extraction of the fastener. The tool may but need not be anchored in the wall structure because it is often sufficient to move only the expander in strong engagement with the material which surrounds the expansion anchor hole.

An important advantage of my method is that the expansion anchor assembly may be mounted with little loss in time. This will be readily understood since the step of removing the drilling tool may be dispensed with, and this is possible because the tool actually constitutes a component part of the expansion anchor assembly.

Another important advantage of my method is that the expansion anchor hole may be drilled with the help of a very simple and inexpensive tool since the latter may consist of sheet metal or the like and need not be sharpened because it remains in the hole.

Without further analysis, the foregoing will so fully reveal the gist of the present invention that others can, by applying current knowledge, readily adapt it for various applications without omitting features which fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. A method of mounting an expansion anchor assembly in a brittle wall structure, comprising the steps of drilling in the exposed side of the wall structure an expansion anchor hole by means of a tubular tool member one end portion of which constitutes a cutter and thereupon leaving the tool member in the thus drilled hole; inserting into the tool member a radially deformable tubular expander member; and introducing a fastener through the tool member and into the expander member so that the latter is deformed radially outwardly whereby at least one of said members moves into engagement with the material which surrounds the expansion anchor hole.

2. A method of mounting an expansion anchor assembly in a brittle wall structure, comprising the steps of drilling in the exposed side of the wall structure an expansion anchor hole by means of a slotted tubular tool member one end portion of which constitutes a cutter and thereupon leaving the tool member in the thus drilled hole; inserting into the tool member a radially deformable tubular expander member so that a portion of the expander member is adjacent to the slot of the tool member; and introducing a fastener through the tool member and into the expander member so that said portion of the expander member is deformed radially outwardly to extend through the slot and into engagement with the material which surrounds the expansion anchor hole.

3. A method as set forth in claim 2, wherein the expander member is inserted into said one end portion of the tool member.

4. An expansion anchor assembly for holding articles at the exposed sides of brittle wall structures which are provided with expansion anchor holes, comprising an elongated sleeve member having a cutter portion at one end thereof so that said sleeve member may be utilized as a tool for drilling the hole in which the expansion anchor assembly is installed and thereupon remains in the thus drilled hole; and expander member comprising a radially movable portion received in the interior of said sleeve member; and a fastener comprising an elongated stem extending through said sleeve member and into said expander member so that said portion of the expander member is moved radially outwardly whereby at least one of said members is maintained in engagement with the material surrounding the hole in which said sleeve member is installed to prevent extraction of said fastener.

5. An expansion anchor assembly for holding articles at the exposed sides of brittle wall structures which are provided with expansion anchor holes, comprising an elongated sleeve having a longitudinally extending slot and comprising a cutter portion at one end thereof so that said sleeve may be utilized as a tool for drilling the hole in which the expansion anchor assembly is installed and thereupon remains in the thus drilled hole; an expander comprising a tubular portion received in said sleeve and a projection received in said slot and having a portion normally extending into the interior of said tubular portion;

and a fastener comprising an elongated stem extending into said sleeve and into said tubular portion so that said projection is moved radially outwardly beyond the outline of said sleeve and into engagement with the material surrounding the hole in which the sleeve is received to prevent extraction of said fastener.

6. An expansion anchor assembly for holding articles at the exposed sides of brittle wall structures which are provided with expansion anchor holes, comprising an elongated sleeve having an extending slot and comprising a cutter portion at one end thereof so that the said sleeve may be utilized as a tool for drilling the hole in which the expansion anchor assembly is installed and thereupon remains in the thus drilled hole, said cutter portion comprising a plurality of annularly arranged teeth; an expander comprising a tubular portion received in said sleeve and a projection received in said slot and having a portion normally extending into the interior of said tubular portion; and a fastener comprising an elongated stem extending into said sleeve and into said tubular portion so that said projection is moved radially outwardly beyond the outline of said sleeve and into engagement with the material surrounding the hole in which the sleeve is received to prevent extraction of said fastener.

7. An expansion anchor assembly for holding articles at the exposed sides of brittle wall structures which are provided with expansion anchor holes, comprising an elongated sleeve having a longitudinally extending slot and comprising a cutter portion at one end thereof so that said sleeve may be utilized as a tool for drilling the hole in which the expansion anchor assembly is installed and thereupon remains in the thus drilled hole; an expander comprising a slitted tubular portion received in said sleeve and a projection recieved in said slot and having a portion normally extending into the interior of said tubular portion, said projection having an outer face provided with transversely extending ribs; and a fastener comprising an elongated stem extending into said sleeve and into said tubular portion so that said projection is moved radially outwardly beyond the outline of said sleeve and said ribs penetrate into the material surrounding the hole in which the sleeve is received to prevent extraction of said fastener.

8. An expansion anchor assembly for holding articles at the exposed sides of brittle wall structures which are provided with expansion anchor holes, comprising an elongated sleeve having a longitudinally extending slot and comprising a cutter portion at one end thereof so that said sleeve may be utilized as a tool for drilling the hole in which the expansion anchor assembly is installed and thereupon remains in the thus drilled hole; an expander comprising an internally threaded tubular portion received in said sleeve and a projection received in said slot and having a portion normally extending into the interior of said tubular portion, and a fastener comprising an elongated externally threaded stem extending into said sleeve and meshing with said tubular portion so that said projection is moved radially outwardly beyond the outline of said sleeve and into engagement with the material surrounding the hole in which the sleeve is received to prevent extraction of said fastener.

9. An expansion anchor assembly for holding articles at the exposed sides of brittle wall structures which are provided with expansion anchor holes, comprising an elongated sleeve having a longitudinally extending slot and comprising a cutter portion at one end thereof so that said sleeve may be utilized as a tool for drilling the hole in which the expansion anchor assembly is installed and thereupon remains in the thus drilled hole; an expander comprising a tubular portion received in said cutter portion and a projection received in said slot and having a portion normally extending into the interior of said tubular portion; and a fastener comprising an elongated stem extending into said sleeve and into said tubular portion so that said projection is moved radially outwardly beyond the outline of said sleeve and into engagement with the material surrounding the hole in which the sleeve is received to prevent extraction of said fastener.

10. An expansion anchor assembly for holding articles at the exposed sides of brittle wall structures which are provided with expansion anchor holes, comprising an elongated sleeve having a longitudinally extending slot, said sleeve consisting of rolled sheet metal and comprising a cutter portion at one end thereof so that said sleeve may be utilized as a tool for drilling the hole in which the expansion anchor assembly is installed and thereupon remains in the thus drilled hole; an expander comprising a tubular portion received in said sleeve and a projection received in said slot and having a portion normally extending into the interior of said tubular portion; and a fastener comprising an elongated stem extending into said sleeve and into said tubular portion so that said projection is moved radially outwardly beyond the outline of said sleeve and into engagement with the material surrounding the hole in which the sleeve is received to prevent extraction of said fastener.

11. An expansion anchor assembly for holding articles at the exposed sides of brittle wall structures which are provided with expansion anchor holes, comprising an elongated sleeve having a longitudinally extending slot and comprising a cutter portion at one end thereof so that said sleeve may be utilized as a tool for drilling the hole in which the expansion anchor assembly is installed and thereupon remains in the thus drilled hole; an expander comprising a radially expandible tubular portion received in said sleeve and a projection received in said slot and having a portion normally extending into the interior of said tubular portion; and a fastener comprising an elongated stem extending into said sleeve and into said tubular portion so that said tubular portion expands to deform said sleeve into strong frictional engagement with the material of the wall structure and said projection is moved radially outwardly beyond the outline of said sleeve and into engagement with the material surrounding the hole in which the sleeve is received to prevent extraction of said fastener.

12. An expansion anchor assembly for holding articles at the exposed sides of brittle wall structures which are provided with expansion anchor holes, comprising an elongated sleeve having a longitudinally extending slot and including an expandible cutter portion at one end thereof so that said sleeve may be utilized as a tool for drilling the hole in which the expansion anchor assembly is installed and thereupon remains in the thus drilled hole; an expander comprising an expandible tubular portion provided with internal threads and received in said cutter portion, and a projection comprising a first portion received in said slot and a second portion normally extending into the interior of said tubular portion; and a fastener comprising an elongated stem provided with external threads and extending through said sleeve and into mesh with said tubular portion whereby the second portion of said projection is moved radially outwardly into engagement with the material surrounding the hole in which said sleeve is received, the internal diameter of said tubular portion in unexpanded condition thereof being less than the diameter of said stem so that, upon receiving said stem, said tubular portion expands to expand said cutter portion radially outwardly and into frictional engagement with the material surrounding the expansion anchor hole.

13. An expansion anchor assembly for holding articles at the exposed sides of brittle wall structures which are provided with expansion anchor holes, comprising an elongated cylindrical sleeve member having a cutter portion at one end thereof so that said sleeve member may be utilized as a tool for drilling the hole in which the expansion anchor assembly is installed and thereupon remains in the thus drilled hole; an expander member comprising a radially deformable cylindrical portion received in the interior of said sleeve member; and a fastener comprising an elongated stem extending through said sleeve member and into said expander member so that said portion of the expander member is moved radially outwardly whereby at least one of said members is maintained in engagement with the material surrounding the hole in which said sleeve member is installed to prevent extraction of said fastener.

14. An expansion anchor assembly as set forth in claim 13, wherein said fastener is a bolt having a threaded stem and wherein said expander member is provided with internal threads to mesh with said stem, said bolt having a retaining portion adjacent to the exposed side of the wall structure so that an apertured article through which the stem passes may be held between said retaining portion and the exposed side of the wall structure.

15. An expansion anchor assembly as set forth in claim 13, wherein said expander member consists of metallic material and wherein said radially movable portion of the expander member is slitted.

References Cited by the Examiner
UNITED STATES PATENTS

| | | | |
|---|---|---|---|
| 1,621,598 | 3/1927 | Phillips | 85—68 |
| 1,963,301 | 6/1934 | Gloystein | 52—704 |
| 3,014,399 | 12/1961 | Schaffner | 85—66 |

FRANK L. ABBOTT, *Primary Examiner.*

J. L. RIDGILL, *Assistant Examiner.*